(12) United States Patent
Lübkert et al.

(10) Patent No.: US 12,064,856 B2
(45) Date of Patent: Aug. 20, 2024

(54) ECCENTRIC DRIVE FOR A PORTABLE POWER TOOL

(71) Applicant: Hilti Aktiengesellschaft, Schaan (LI)

(72) Inventors: Ernst-Rudolf Lübkert, Landsberg am Lech (DE); Ferdinand Kristen, Gilching (DE); Michael Göttlinger, Landshut (DE); Maximilian Kummer, Ulm (DE); Michael Schamberger, Scheuring (DE); Johannes Marder, Neu-Ulm (DE); Jeltsch Thomas, Domat/Ems (CH); Simon Weis, Aschaffenburg (DE); Andreas Janisch, Domat/Ems (DE)

(73) Assignee: Hilti Aktiengesellschaft, Schaan (LI)

( * ) Notice: Subject to any disclaimer, the term of this patent is extended or adjusted under 35 U.S.C. 154(b) by 680 days.

(21) Appl. No.: 17/273,013

(22) PCT Filed: Sep. 24, 2019

(86) PCT No.: PCT/EP2019/075676
§ 371 (c)(1),
(2) Date: Mar. 3, 2021

(87) PCT Pub. No.: WO2020/069917
PCT Pub. Date: Apr. 9, 2020

(65) Prior Publication Data
US 2021/0323135 A1    Oct. 21, 2021

(30) Foreign Application Priority Data
Oct. 4, 2018 (EP) .................................. 18198563

(51) Int. Cl.
*B25D 11/12* (2006.01)
*B29C 45/00* (2006.01)
(Continued)

(52) U.S. Cl.
CPC ........ *B25D 11/125* (2013.01); *B29C 45/0005* (2013.01); *B29C 45/14786* (2013.01);
(Continued)

(58) Field of Classification Search
CPC ........ B25D 2211/068; B25D 2211/062; B25D 2211/064; B25D 2211/065;
(Continued)

(56) References Cited

U.S. PATENT DOCUMENTS 5,320,177 A * 6/1994 Shibata .................. B25D 17/00
173/48
7,252,155 B2 * 8/2007 Goetzfried ............ B23B 51/042
173/132
(Continued)

FOREIGN PATENT DOCUMENTS

DE    3314414 A1    10/1984
DE    3928855 A1    3/1991
(Continued)

OTHER PUBLICATIONS

International Search Report of PCT/EP2019/075676, dated Nov. 25, 2019.

*Primary Examiner* — Joshua G Kotis
(74) *Attorney, Agent, or Firm* — Davidson Kappel LLC

(57) ABSTRACT

An eccentric drive 1 for a portable power tool 2 has a motor 5, an eccentric wheel 6, a linear guide 9, a slide 8 and a connecting rod 7, which has a head 17 suspended on the slide 8 and a second head 15 suspended on the eccentric wheel 6. A bearing bush 16 for the rotatable mounting of the connecting rod 7 is provided at least on one of the two heads 17. The head 15 is composed of an injection molding material. The bearing bush 16 is composed of a fiber composite material, which includes continuous carbon fibers 25 embedded in a thermoplastic matrix.

13 Claims, 2 Drawing Sheets

(51) Int. Cl.
   *B29C 45/14* (2006.01)
   *B29K 77/00* (2006.01)
   *B29K 105/08* (2006.01)
   *B29K 105/12* (2006.01)
   *B29K 307/04* (2006.01)
   *B29L 31/00* (2006.01)

(52) U.S. Cl.
   CPC .... *B25D 2211/068* (2013.01); *B25D 2222/06* (2013.01); *B25D 2222/61* (2013.01); *B25D 2250/181* (2013.01); *B25D 2250/331* (2013.01); *B29K 2077/00* (2013.01); *B29K 2105/08* (2013.01); *B29K 2105/12* (2013.01); *B29K 2307/04* (2013.01); *B29L 2031/748* (2013.01)

(58) Field of Classification Search
   CPC ........ B25D 2211/067; B25D 2250/331; B25D 11/12; B25D 2222/06; B25D 2222/61; B25D 2250/181
   See application file for complete search history.

(56) References Cited

U.S. PATENT DOCUMENTS

| | | | |
|---|---|---|---|
| 10,245,647 B2 * | 4/2019 | Popp | B23P 11/025 |
| 2008/0173457 A1 * | 7/2008 | Kahra | B25D 17/08 |
| | | | 173/90 |
| 2011/0311172 A1 | 12/2011 | Frank | |

FOREIGN PATENT DOCUMENTS

| | | | | |
|---|---|---|---|---|
| DE | 102014225435 A1 | | 6/2016 | |
| EP | 2403711 B1 | | 4/2013 | |
| GB | 1426770 A | * | 3/1976 | ........... B25D 11/125 |
| GB | 1426770 A | | 3/1976 | |
| JP | S5411902 U | | 1/1979 | |

* cited by examiner

ECCENTRIC DRIVE FOR A PORTABLE POWER TOOL

The present invention relates to an eccentric drive for a portable power tool.

BACKGROUND

DE 3314414 A1 describes a hammer drill having an eccentric drive. The eccentric drive contains a connecting rod made of polyamide.

A connecting rod made of plastic can be produced in an injection molding process. The plastic is injected into a mold. The plastic flows along the cavities and should fill these completely. In the case of a connecting rod, the flows divide ahead of an eye and meet again after the eye. During this process, a seam may be formed, and this can be prevented only at some effort. The seam is a potential weak point of the connecting rod.

SUMMARY OF THE INVENTION

An eccentric drive according to the invention for a portable power tool has a motor, an eccentric wheel, which is driven by a motor, a linear guide, a slide, which is guided along an axis by the linear guide, and a connecting rod, which has a head suspended on the slide and a second head suspended on the eccentric wheel. A bearing bush for the rotatable mounting of the connecting rod is provided on at least one of the two heads. The head is composed of an injection molding material. The bearing bush is composed of a fiber composite material, which comprises continuous carbon fibers embedded in a thermoplastic matrix.

The continuous fibers absorb the loads imposed by the eccentric wheel over an extended area. In this case, the continuous fibers are substantially under tensile load. The thermoplastic matrix of the bearing bush is subjected to only slight loads, and the bearing bush maintains its shape. The forces are transmitted from the bearing bush to the head over a large area via a substantial segment of the outer surface of the bearing bush, thereby relieving the load on the head seam formed during the injection process.

The use of carbon fibers proves to be very advantageous in respect of the wear on the eccentric wheel and friction losses.

One embodiment envisages that the injection molding material contains a thermoplastic. The injection molding material can join in a materially integral manner to the bearing bush without a joining zone. A uniform transmission of the forces between the bearing bush and the head is thereby improved.

One embodiment envisages that the continuous carbon fibers extend along an inner surface of the bearing bush. A finger of the eccentric wheel rests directly against the continuous carbon fibers. Loading of the soft thermoplastic matrix is thereby reduced.

One embodiment envisages that the continuous carbon fibers extend along an inner surface of the bearing bush. The continuous carbon fibers preferably extend at least once, preferably more than three times, around the inner surface.

One embodiment envisages that a length of the continuous carbon fibers corresponds at least to the circumference of the inner surface of the bearing bush. The continuous fibers surround the inner surface as if it were in a ring, thereby ensuring high stability.

BRIEF DESCRIPTION OF THE DRAWINGS

The following description explains the invention with reference to exemplary embodiments and figures, in which.

Identical or functionally identical elements are indicated by the same reference numerals in the figures, unless stated otherwise.

DETAILED DESCRIPTION

Figure 1:
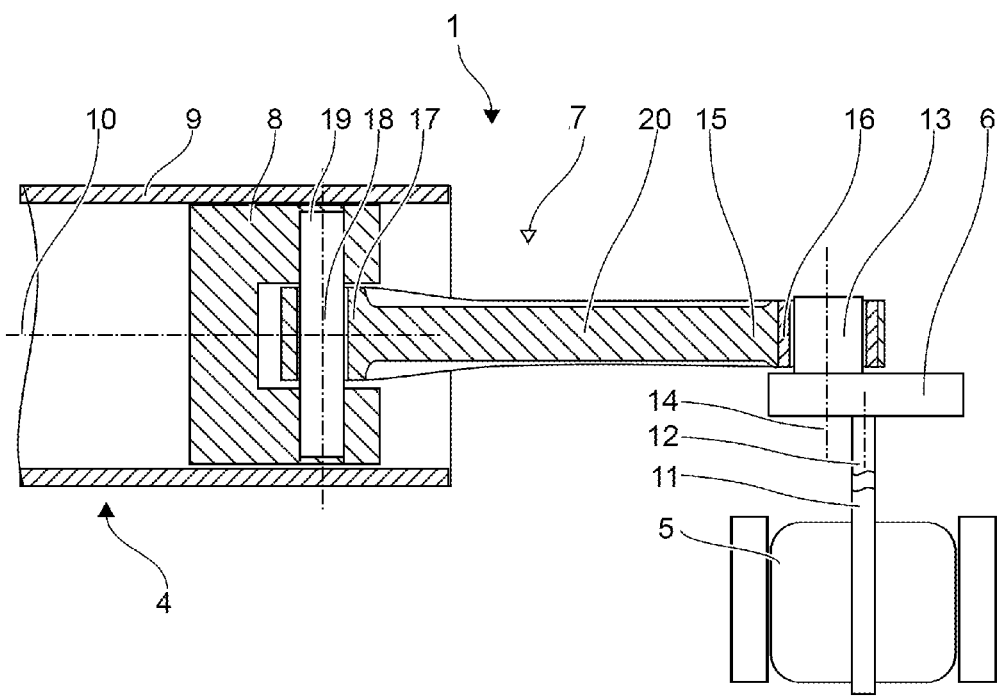
FIG. 1 shows a connecting rod in a longitudinal section

FIG. 1 shows an illustrative embodiment of an eccentric drive 1. The eccentric drive 1 is provided, in particular, for use in portable power tools 2 having a linearly moved tool 3 (see, e.g., FIG. 4), e.g. in the case of a hammer drill 2 (FIG. 4), chipping hammer, jig saw, reciprocating saw etc. The eccentric drive 1 drives a mechanical striking mechanism, a pneumatic striking mechanism 4 or a pendulum stroke mechanism, for example.

Figure 4:
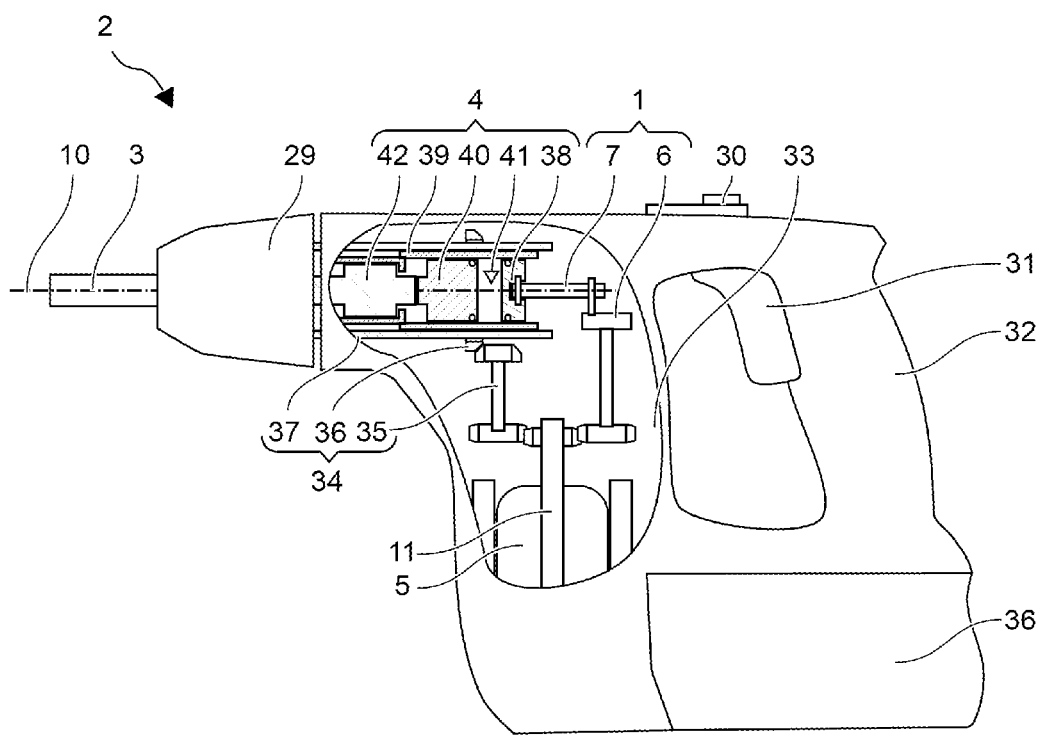
FIG. 4 shows a hammer drill

The eccentric drive 1 contains a motor 5, an eccentric wheel 6, a connecting rod 7 and a slide 8 in a linear guide 9. The slide 8 is movable in a linear guide 9, being guided along a working axis 10. The eccentric drive 1 moves the slide 8 periodically backward and forward along this working axis 10. The slide 8 can be a piston, a driver for a tool, etc. The force for the movement is fed in by the motor 5. The motor 5 is preferably an electric motor 5. In alternative configurations, the motor 5 can also be an internal combustion engine. The motor 5 has an output shaft 11, which the motor 5 drives in rotation about an axis. The output shaft 11 is coupled to the eccentric wheel 6. As in FIG. 1, the output shaft 11 can be connected directly to the eccentric wheel 6 or, as illustrated in FIG. 4, can be connected to the eccentric wheel 6 indirectly via a transmission, a slip clutch or similar components. The eccentric wheel 6 is mounted so as to be rotatable about a (rotation) axis 12. The rotation axis 12 is arranged perpendicularly to the working axis 10. The motor 5 drives the eccentric wheel 6 in rotation about the rotation axis 12. The eccentric wheel 6 has a (bearing) finger 13 offset with respect to the rotation axis 12. The finger 13 is typically of cylindrical design. The eccentric axis 14 is parallel to the rotation axis 12. The connecting rod 7 is mounted on the finger 13 by means of an input-side head 15. The head 15 has a bearing bush 16, into which the finger 13 is inserted. The finger 13 and the bearing bush 16 form a rotary bearing. The connecting rod 7 is suspended so as to be rotatable relative to the finger 13 about the eccentric axis 14. An output-side head 17 of the connecting rod 7 is supported on the slide 8. The output-side head 17 is suspended so as to be pivotable relative to the slide 8 about a pivot axis 18. The head 17 is supported in the slide 8 on a cylindrical shaft 19, for example. The pivot axis 18 is parallel to the eccentric axis 14. A shank 20 of the connecting rod 7 rigidly connects the input-side head 15 and the output-side head 17. The shank 20 is typically an elongate rod. The rod is preferably straight. In special configurations, the rod can be bent, angled or stepped. Withdrawal of the objection to the drawings is respectfully requested.

Figure 2:
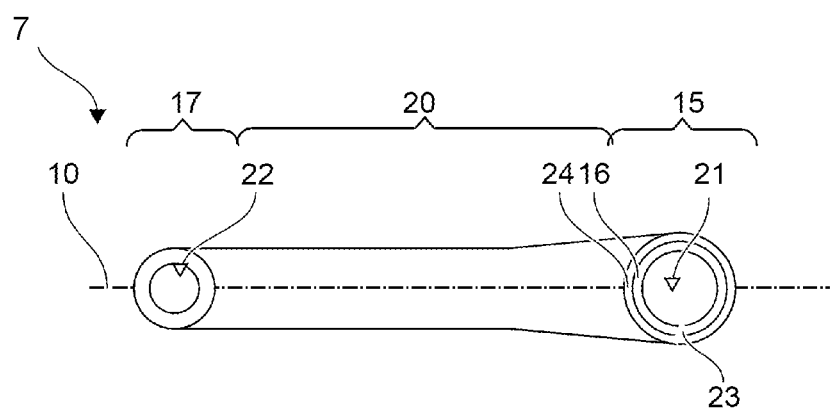
FIG. 2 shows the connecting rod in a plan view

The illustrative connecting rod 7 in FIG. 1 is illustrated in a plan view in FIG. 2. The connecting rod 7 comprises the shank 20, at the two ends of which are arranged the input-side head 15 and the output-side head 17, respectively. In the embodiment illustrated, the two heads are configured differently. In alternative embodiments, the two heads can be identical, of the same size or of the same construction while having different diameters.

The input-side head 15 has an annular construction. In the head 17 there is a cavity, which is referred to as an eye 21. The eye 21 can be arranged centrally in the head 15. A wall of the head 15 surrounding the eye 21 can be uniform. A wall thickness of the wall is preferably the same over at least one quarter, preferably over at least half, the circumference of the eye 22. An inner surface 23 of the head 17, i.e. the surface enclosing the eye 21, is cylindrical.

The illustrative head 15 comprises an outer body 24 and the bearing bush 16, which is embedded in the body 24. The outer body 24 surrounds the bearing bush 16 in a ring shape. The body 24 forms the main part of the wall. A wall thickness of the body 24 makes up a proportion of at least 75% of the wall thickness of the head 15, for example. A dimension (height) of the bearing bush 16 along the eccentric axis 14 is equal to or somewhat less than the dimension of the head 15.

The body 24 of the head 15 is composed of an injection molding material. The injection molding material is composed of a thermoplastic or of a mixture of thermoplastics. Particularly suitable groups of substances are polybutylene terephthalate (PBT) and polyamide (PA), and, from the group of substances comprising the polyamides, poly-(N, N'-hexamethylene-adipine-diamide)-poly-(hexamethylene-adipamide) is particularly suitable. Other suitable thermoplastics are from the groups of substances comprising polyetheretherketone (PEEK), polyphenylenesulfide (PPS), polysulfone (PSU), polyetherimide (PEI) and polytetrafluorethene (PTFE). The injection molding material can be processed sufficiently well, and the connecting rod 7 is sufficiently rigid and durable.

The injection molding material can be a fiber-reinforced thermoplastic. A matrix of the injection molding material is a thermoplastic, preferably composed of one of the groups of substances comprising polybutylene terephthalate (PBT) and polyamide (PA). One particularly suitable polyamide is poly-(N,N'-hexamethylene-adipine-diamide)-poly-(hexamethylene-adipamide). Alternative groups of substances are polyetheretherketone (PEEK), polyphenylenesulfide (PPS), polysulfone (PSU) and polyetherimide (PEI). Fibers are embedded in the matrix. Fibers suitable for the production of the head 15 are "short fibers". A length of the short fibers is significantly less than the dimensions of the head 17 or of the connecting rod 7. A length is, in particular, less than a height of the connecting rod 7, a width of the connecting rod 7 and a length of the connecting rod 7. The fibers are preferably shorter than each dimension of the cavities in the injection mold, e.g. shorter than the wall thickness of the body 24. A length of the fibers can be in a range of between 0.3 mm and 1 mm, for example. An aspect ratio of the length to the diameter of the fibers is in a range of between 50 and 500, for example. The short fibers can be injected into the injection mold after being mixed with the thermoplastic. The short fibers are distributed uniformly in a controlled manner in the injection mold. The fibers are aligned according to the flow direction during the injection of the thermoplastic. Here, the relative alignment depends on the length of the fibers and the speed of flow of the thermoplastic. Short fibers tend to align themselves transversely to the flow direction. The short fibers can be carbon fibers, aramid fibers, glass fibers or a mixture of said fibers.

The bearing bush 16 is composed of a fiber composite material, which comprises continuous carbon fibers 25 embedded in a thermoplastic matrix. The matrix is preferably composed of the same thermoplastic or at least of the same group of substances as the body 24. In the case of a preferred pairing, the thermoplastic of the body 24 and of the bearing bush 16 are both composed of the group of substances comprising the polyamides. The matrix of the bearing bush 16 is composed of polycaprolactam (PA6) and the matrix of the body 24 is composed of poly-(N,N'-hexamethylene-adipine-diamide)-poly-(hexamethylene-adipamide), for example. So-called continuous fibers 25 are embedded in the matrix. The thermoplastic of the body 24 and the thermoplastic of the bearing bush 16 can join together in a materially integral manner. For this purpose, the thermoplastic of the bearing bush 16 can be slightly melted as the thermoplastic for the body 24 is introduced. The slight melting can be achieved, inter alia, by means of an external heat source, e.g. an infrared heating system, by means of the heat of the still liquid thermoplastic of the body 24 or similar. For this purpose, the melting point of the thermoplastic of the body 24 is preferably higher than the melting point of the thermoplastic for the bearing bush 16, the melting points differing by at least 10° C. (Celsius) for example, e.g. at least 20° C., at least 30° C., and at most by 40° C. The melting points are within the range of between 200° C. and 350° C.

While the body 24 can preferably contain short fibers, the bearing bush 16 contains substantially only continuous fibers 25. A length of the continuous fibers 25 is limited by the dimensions of the bearing bush 16. The continuous fibers 25 begin at one end 26 of the bearing bush 16 and end at the opposite end 27 of the bearing bush 16. A length of the continuous fibers 25 thus corresponds at least to the height of the bearing bush 16, which is substantially equal to the height of the connecting rod 7.

The continuous fibers 25 are aligned in an ordered manner on the cylindrical inner surface 23. The continuous fibers 25 extend circumferentially along the inner surface 23. The innermost of the continuous fibers 25 lie exposed on the inner surface 23. Close arrangement of the continuous fibers 25 makes it possible for a considerable proportion of the inner surface 23 to be formed by the continuous fibers 25. The continuous fibers 25 preferably make up a proportion of at least 25%, e.g. at least 50%, of the inner surface 23.

Figure 3:
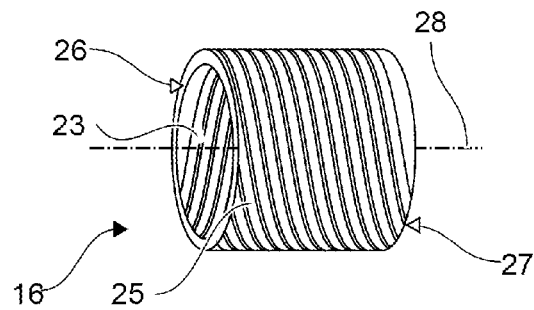
FIG. 3 shows a bearing bush of the connecting rod in FIG. 2

An illustrative arrangement of the continuous fibers 25 is illustrated in FIG. 3. The continuous fibers 25 are wound helically around the inner surface 23. The continuous fibers 25 run around the eye 21 (see, e.g., FIG. 2) once or preferably several times. The continuous fibers 25 thus extend with a constant or approximately constant radius relative to the eccentric axis 14. A radius of curvature of the path of the continuous fibers 25 is determined by the diameter of the bearing bush 16. A length of the continuous fibers 25 is preferably greater than the circumference of the bearing bush 16, e.g. more than twice as long as the circumference. The continuous fibers 25 can be grouped into fiber bundles. The fiber bundles can be found in the same direction of rotation. As an alternative, one group of fiber bundles can run anticlockwise and another group of fiber bundles can run clockwise around the inner surface 23. A plurality of fiber bundle plies can be arranged in layers one above the other. The fiber bundles can be wound, braided, woven or laid.

The circumferential arrangement of the continuous fibers 25 produces a high stability of the bearing bush 16. The finger 13 of the eccentric wheel 6 rests against segments and not pointwise against the continuous fibers 25 when under load. The continuous fibers 25 distribute the introduced forces along the circumference and thus, as tensile forces, along the length thereof. The continuous fibers 25 can absorb the forces almost alone, without imposing loads on the thermoplastic matrix. The thermoplastic matrix can be flexibly soft, i.e. can be deflected under the forces which occur.

The continuous fibers 25 are preferably carbon fibers. In contrast to the body 24, glass fibers are not suitable for the bearing bush 16. The carbon fibers have good tribological properties in combination with the eccentric wheel 6, which is typically manufactured from steel. Abrasion of the carbon fibers can contribute to lubrication of the bearing.

The shank 20 of the connecting rod 7 has the same material composition as the body 24 of the head 15. The shank 20 is produced from the same injection molding material as the body 24. The shank 20 and the body 24 can be produced jointly in an injection mold. The shank 20 and the head 15 are a monolithic body, i.e. there are no interfaces, joining zones etc. between the shank 20 and the head 15. The subdivision of the shank 20 and the head 15 is based only on a geometric consideration and a functional association.

The output-side head 17 can be similar in design to the input-side head 15. The output-side head 17 can likewise have an eye 22. A cylindrical longitudinal axis of the eye 22 of the output-side head 17 is parallel to the longitudinal axis 28 of the eye 21 of the input-side head 15 (see, e.g, FIGS. 2 and 3). In an alternative embodiment, the connecting rod 7 has, on the head 17, a rotatable or rigid shaft 19 (see, e,g, FIG. 1) instead of an eye 22.

An illustrative production method for the connecting rod 7 is described below. The bearing bush 16 is produced as a semifinished product consisting of the continuous fibers 25 and the thermoplastic. The semifinished product is inserted into an injection mold for the connecting rod 7. The other thermoplastic is liquefied and, having been mixed with the short fibers, is injected into the injection mold. Injection preferably takes place centrally in the shank 20 in order to keep the flow paths short. The short fibers are carried along by the other thermoplastic and are distributed substantially uniformly in the injection mold. The other thermoplastic runs around the semifinished product. The surface of the semifinished product is slightly melted during this process. The slight melting can be accomplished by the heat input by the other thermoplastic or with additional assistance by external heat sources. The two thermoplastics solidify together and a materially integral joint is obtained. The two thermoplastics can be different, preferably being from the same group of substances.

As indicated, the semifinished product can be produced by winding, braiding or laying the continuous fibers 25 around a core. In one embodiment, the continuous fibers 25 are supplied as fiber bundles in a tape which already contains the thermoplastic. The tape can be produced by dip-wetting of the continuous fibers 25 in a bath of the liquid thermoplastic, for example. The tape is wound around a core to form a tube. The tape is wound with a pitch that corresponds to the maximum width of the tape for each revolution, for example. Adjacent turns of the tape do not overlap here. In another embodiment, the tape can be wound with a partial overlap. Owing to a fluctuation in the width of the tape, cavities can be formed between the adjacent turns. The tube is heated in a furnace, for example, in order to slightly melt the thermoplastic, as a result of which the overlapping plies of the tape join together. Alternatively, heating can be accomplished by means of a laser, hot air or other heat sources. The fiber plies fuse together to form a solid body. Alternatively, the tape can already be slightly melted during winding, e.g. by means of a heated winding core or heat radiation from an infrared light source. The tube can then be cooled. Finally, the tube is cut to the length of the bearing bush 16.

FIG. 4 schematically shows a hammer drill 2 as an example of a hand-held portable power tool having an eccentric drive 1. The illustrative hammer drill 2 has a tool holder 29, into which a tool 3 can be inserted and locked. The tool 3 is, for example, a drill bit, a chisel etc. The embodiment illustrated by way of example turns the tool holder 29 about a working axis 10 and at the same time periodically strikes the tool along the working axis 10. The handheld power tool 2 can have a mode selector button 30 which allows the user to selectively activate and deactivate the rotational movement and selectively activate and deactivate the percussive operation. The user can put the portable power tool 2 into operation by means of a switch 31.

The portable power tool 2 has a handle 32. The user can hold and guide the portable power tool 2 during operation by way of the handle. The button 31 is preferably attached to the handle in such a way that the user can operate the button 31 using the hand holding the handle 32. The handle 32 can be decoupled from a machine housing 33 by means of damping elements.

The portable power tool 2 has a rotary drive 34 which is coupled to the tool holder 29. The rotary drive 34 contains an electric motor 5. The electric motor 5 can have, amongst other things, a step-down gear mechanism 35 and/or a slip clutch 36. An output shaft 37 of the rotary drive 34 is connected to the tool holder 29. The user can switch on and switch off the rotary drive 34 by operating the button 31, wherein the button 31 accordingly controls a power supply to the electric motor 5. In one embodiment, a rotational speed of the electric motor 5 can be adjusted by means of the button 31.

The portable power tool 2 has a pneumatic striking mechanism 4, which is driven by the eccentric drive 1. The eccentric drive 1 contains the electric motor 5, the eccentric wheel 6 and the connecting rod 7 and an exciter piston 10, which can be driven along the working axis 38. The exciter piston 38 is movable in a guided manner in a guide tube 39 along the working axis 10. The exciter piston 38 moves backward and forward periodically as the electric motor 5 rotates. The exciter piston 38 encloses a pneumatic chamber 41 with an impact piston 40. In the illustrated embodiment, radial closure of the pneumatic chamber 41 is provided by the guide tube 39 which at the same time guides the exciter piston 38 and the impact piston. In other embodiments, the impact piston can be of hollow design and the exciter piston 38 is guided in the impact piston, or vice versa. The air enclosed in the pneumatic chamber 41 is compressed and decompressed by the exciter piston 38. The change in pressure couples the impact piston to the movement of the exciter piston 38, and the pneumatic chamber 41 behaves similarly to a spring, and is therefore also called a pneumatic spring. The impact piston 40 can strike the tool directly or strike the tool indirectly by means of an anvil 42.

What is claimed is:
1. An eccentric drive for a portable power tool, the eccentric drive comprising:
a motor;
an eccentric wheel driven by the motor;
a linear guide;
a slide guided along an axis by the linear guide;
a connecting rod having a first head suspended on the slide and a second head suspended on the eccentric wheel;

a bearing bush for rotatable mounting of the connecting rod and provided in at least one of the first and second heads;

wherein the at least one of the first and second heads is composed of an injection molding material, and the bearing bush is composed of a fiber composite material including continuous carbon fibers embedded in a thermoplastic matrix, and wherein the continuous carbon fibers begin at one end of the bearing bush, extend around the bearing bush, and end at an opposite end of the bearing bush.

2. The eccentric drive as recited in claim 1 wherein the continuous carbon fibers extend along an inner surface of the bearing bush.

3. The eccentric drive as recited in claim 2 wherein the continuous carbon fibers extend at least once around the inner surface of the bearing bush.

4. The eccentric drive as recited in claim 2 wherein a length of the continuous carbon fibers corresponds at least to a circumference of the inner surface of the bearing bush.

5. The eccentric drive as recited in claim 1 wherein the injection molding material contains a thermoplastic.

6. The eccentric drive as recited in claim 5 wherein the bearing bush is connected in a materially integral manner to the at least one of the first and second heads.

7. The eccentric drive as recited in claim 5 wherein the thermoplastic is polycaprolactam.

8. The eccentric drive as recited in claim 1 wherein the injection molding material contains short fibers embedded in an injection molding thermoplastic matrix.

9. The eccentric drive as recited in claim 8 wherein the injection molding thermoplastic matrix is fused to the thermoplastic matrix of the fiber composite material.

10. The eccentric drive as recited in claim 8 wherein a length of the short fibers is less than one tenth of a length of the continuous fibers.

11. The eccentric drive as recited in claim 8 wherein the injection molding thermoplastic matrix is poly-(N,N'-hexamethylene-adipine-diamide)-poly-(hexamethylene-adipamide).

12. The eccentric drive as recited in claim 8 wherein a melting point of the injection molding thermoplastic matrix is higher than a melting point of the thermoplastic matrix of the fiber composite material.

13. A portable power tool comprising:
the eccentric drive as recited in claim 1; and
a pneumatic striking mechanism coupled to the eccentric drive.

* * * * *